Figure 1:
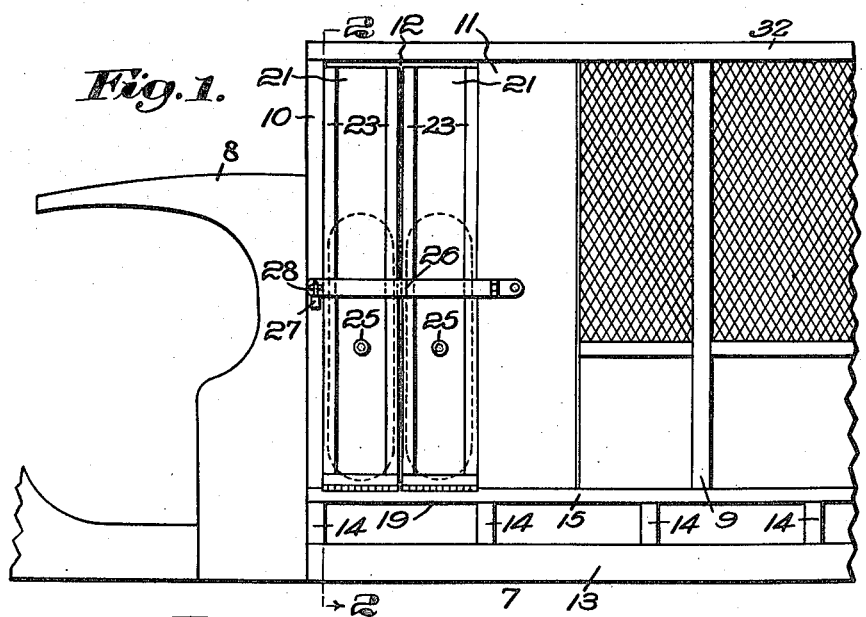

Feb. 20, 1923.

D. G. ROOS.
TIRE CARRIER.
FILED APR. 29, 1920.

1,445,913.

3 SHEETS—SHEET 1.

Inventor:
Delmar G. Roos,
by Emery, Booth, Janney & Varney.
Attys.

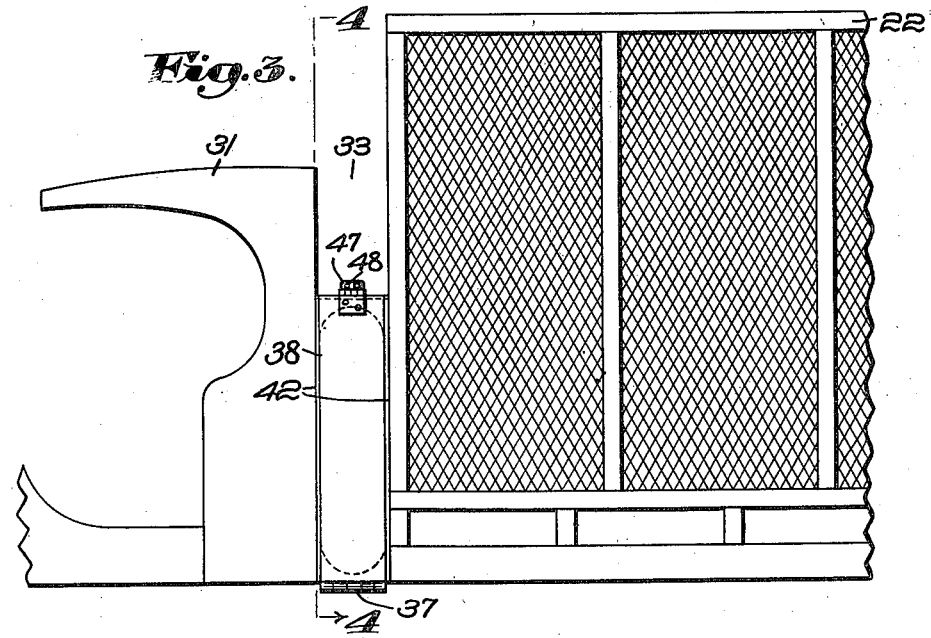
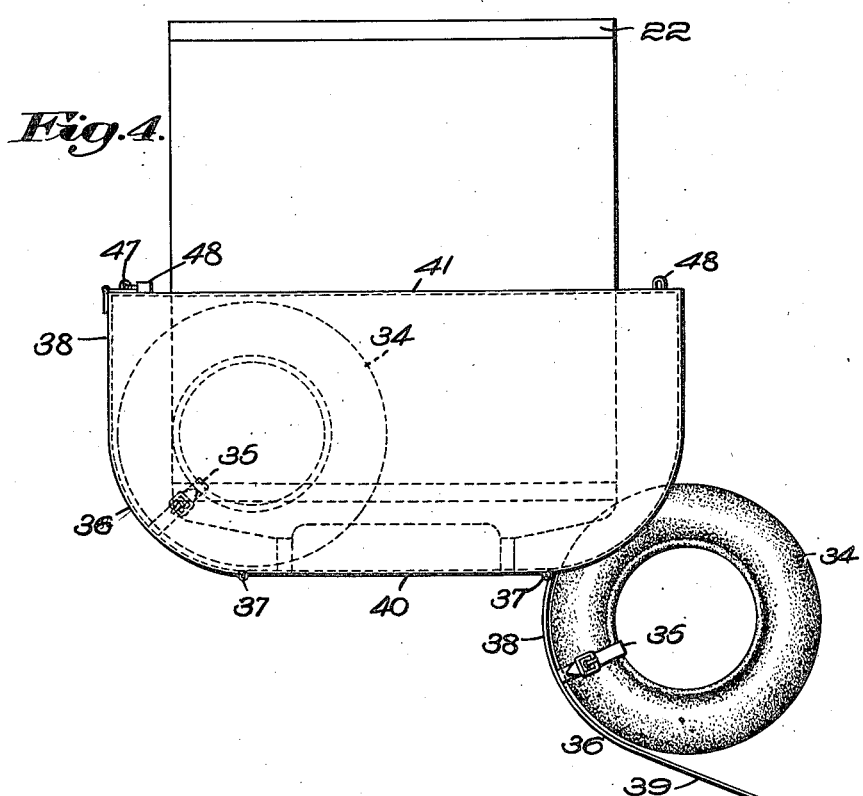

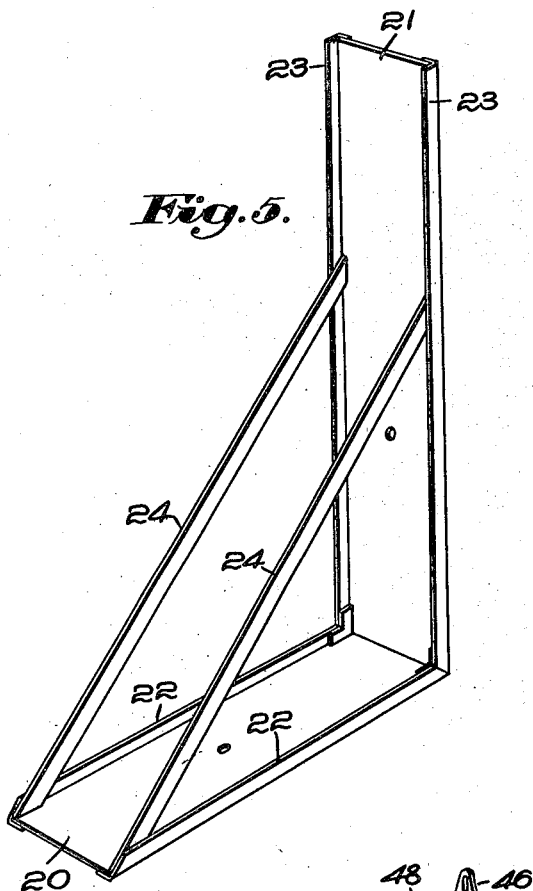
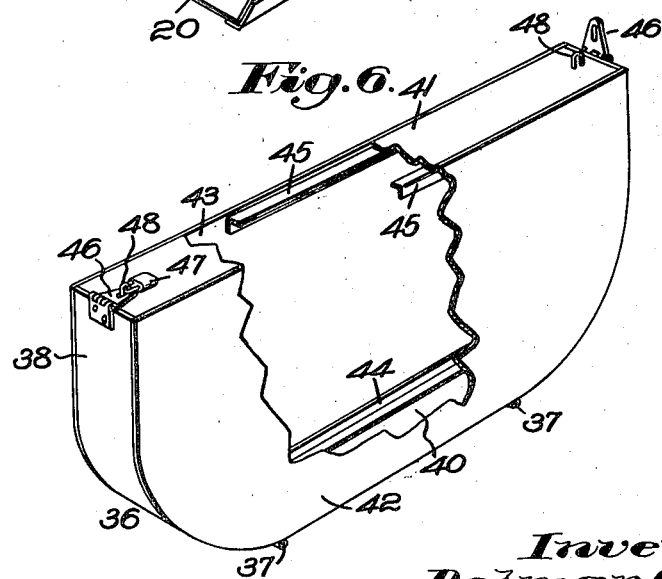

Patented Feb. 20, 1923.

1,445,913

UNITED STATES PATENT OFFICE.

DELMAR G. ROOS, OF BRIDGEPORT, CONNECTICUT, ASSIGNOR, BY MESNE ASSIGNMENTS, TO THE LOCOMOBILE COMPANY, OF BRIDGEPORT, CONNECTICUT, A CORPORATION OF DELAWARE.

TIRE CARRIER.

Application filed April 29, 1920. Serial No. 377,490.

*To all whom it may concern:*

Be it known that I, DELMAR G. ROOS, a citizen of the United States, and a resident of Bridgeport, in the county of Fairfield and State of Connecticut, have invented an Improvement in Tire Carriers, of which the following description, in connection with the accompanying drawings, is a specification, like characters on the drawings representing like parts.

This invention relates to tire carriers for vehicles and is more especially concerned with carrying of spare tires on commercial motor vehicles. My invention will be best understood by reference to the following description when taken in connection with the accompanying drawings of a motor truck equipped with tire carriers embodying my invention, while its scope will be more particularly pointed out in the appended claims.

Figure 2:
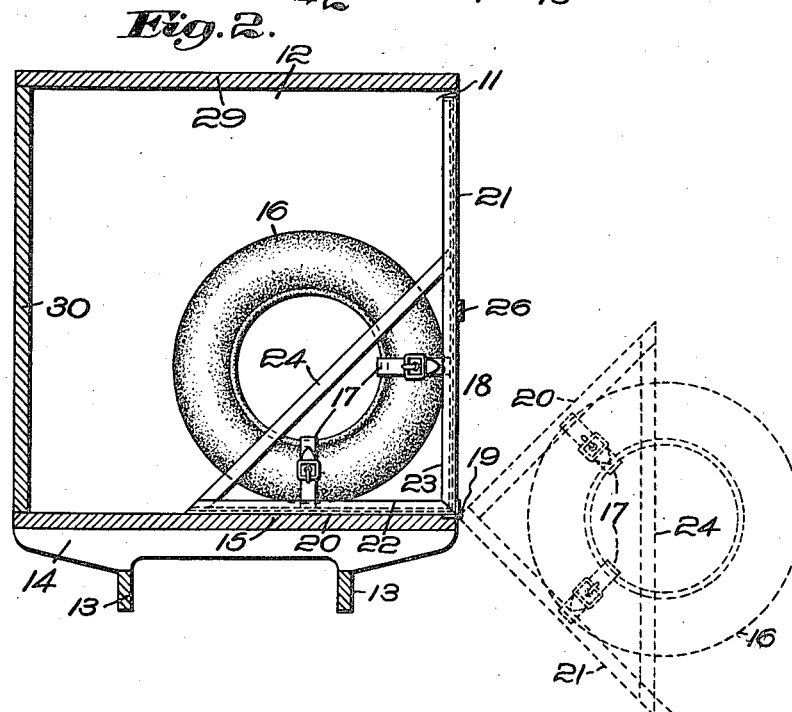

In the drawings:

Fig. 1 is a side elevation of a portion of a motor truck equipped with a body having tire carriers exemplifying my invention;

Fig. 2 is a sectional view on line 2—2 of Fig. 1 showing the tire carrier in full lines in its normal position and in dotted lines in a position to which it may be swung for the convenient removal and replacement of the tire;

Fig. 3 is a side elevation of the vehicle equipped with a tire carrier exemplifying my invention but different in some respects to that which is illustrated in Figs. 1 and 2;

Fig. 4 is a sectional view on line 4—4 of Fig. 3, but showing one of the tire carriers and its tire swung out of its normal position for the convenient removal of the tire from the carrier;

Fig. 5 is a perspective view of one of the tire carriers illustrated in Figs. 1 and 2; and Fig. 6 is a perspective partly broken away of the tire carrier illustrated in Figs. 3 and 4.

Referring to the drawings and to the embodiment of my invention which I have shown for purposes of exemplification in Figs. 1, 2 and 5, a truck body 7 is provided with a seat section 8 and a load carrying section 9, each of any usual or desired construction, the former being arranged in advance of the latter. The seat section is provided with a rear wall 10 and the load carrying section with a front wall 11, said walls being separated by a tire receiving chamber 12 extending transversely of the body. The latter is provided with a suitable framework herein comprising a pair of longitudinal sills 13 and a plurality of transverse members 14 which provide a support for a floor 15.

The increasing use of large pneumatic tires on commercial vehicles has made it desirable to provide suitable means to hold and protect the spare tires. Heretofore the means employed for this purpose have more or less interfered with the storage and handling of goods carried by the truck and but little attention has been paid to the convenient handling of the heavy tires. The present invention aims to overcome these difficulties and I have provided tire carrying means which interfere very little with the storage of the goods and which provide a conveniently operated means for the removal and replacement of the tires. Provision is also made to protect the tires from the action of the elements and from the accumulation of foreign matter as well as to protect the tires against theft.

One or more tires may be carried in the tire carrying chamber and in the example shown in Figs. 1, 2 and 5 I have made provision for two which are mounted in independent duplicate carriers one behind the other. Since the tire carriers are identical, a description of one will suffice for both.

In this embodiment a tire 16 is suitably secured as by one or more straps 17 to a swinging support 18 which is hingedly mounted to swing about the axis of a pivot 19 extending longitudinally of the vehicle. In this instance the swinging support (see Fig. 5) comprises a horizontal plate 20 and a vertical plate 21 suitably reenforced as by angle irons 22 and 23 and braced by diagonal braces 24, the latter also serving as a convenient means to confine the tire and to prevent its movement lengthwise of the vehicle. The straps 17 may be secured to the plates 20 and 21 by appropriate means herein rivets 25.

Each of the tire carriers is mounted to swing from its normal elevated position shown in full lines of Figs. 1 and 2 to a lowered position represented in dotted lines in Fig. 2 thereby to render the tire accessible for detachment from its carrier. Assuming that the vehicle is standing at the curb, the carrier may thus be lowered to a convenient working position at the edge of the side-walk and the tire may be removed without disturbing in any way the goods that occupy the load receiving space of the body. The tire carrier having thus been lowered, the tire can be removed therefrom by simply unfastening the straps 17 whereupon the tire will roll down the inclined plane of the tire carrier onto the sidewalk or roadway as the case may be. The injured tire when removed from the wheel can be placed on the tire carrier and the latter swung upward into its chamber where it can be secured by suitable means in the present instance a hinged bar 26 and a padlock 27 received in a hasp 28. In this example a single locking means is common to both tire carriers.

The tire receiving chamber 12 is preferably closed on all sides. In the embodiment the top is closed by a roof 29, one side by a wall 30 and the other side by the vertical plates 21 of the tire carriers themselves.

Referring now to the embodiment of my invention which is illustrated in Figs. 3, 4 and 6 I have shown a construction which has much in common with the one hereinbefore described. A seat section 31 and load carrying section 32 are separated by a tire receiving space 33 extending transversely of the vehicle. Within this space two tires 34 are carried side by side and are suitably secured as by straps 35 to swinging supports 36, the latter being hingedly mounted to swing about pivots 37 extending lengthwise of the vehicle. In this example each support 36 has a curved portion 38 which is concentric with the tire and a vertical portion 39.

In this embodiment the swinging members 36 constitute closures for the sides or ends of a container having a bottom 40, top 41 and front and back walls 42 and 43 (see Fig. 6). This container may be suitably reenforced internally as by angle irons 44 and 45. The swinging supports may be normally locked by suitable means herein hinged bars 46 and padlock 47, the latter being received in hasps 48. The operation of removing and replacing the tires in this embodiment should be obvious from the foregoing description of the operation of the embodiment previously described.

Having thus described two embodiments of my invention, but without limiting myself thereto, what I claim and desire by Letters Patent to secure is:—

1. In a vehicle, the combination of a body having a seat and a storage space at the rear of said seat, and a tire carrier intermediate said seat and said storage space, and mounted to move laterally with reference to the length of the vehicle.

2. In a vehicle, the combination of a body provided with a load-receiving space, and a tire carrier extending transversely of said body forward of said load-receiving space and mounted to move transversely of said body.

3. In a vehicle, the combination of a body, a tire-carrier mounted thereon to swing about an axis extending longitudinally thereof, and a tire carried by said tire-carrier and mounted thereon with the axis extending longitudinally of said body.

4. In a vehicle, the combination of a support, a tire-carrier hinged to said support, and a tire mounted on said support, said tire-carrier being mounted to swing into position to present an inclined plane to which the periphery of said tire is tangent.

5. In a vehicle, the combination of a support, a tire, and a tire-carrier having a part which is normally in a generally upright position and is pivoted to swing into position to present an inclined plane to which the tread of said tire is tangent.

In testimony whereof, I have signed my name to this specification.

DELMAR G. ROOS.